(12) United States Patent
Engelsberg

(10) Patent No.: US 7,053,962 B1
(45) Date of Patent: May 30, 2006

(54) METHOD AND DEVICE FOR DETERMINING AN IMAGE SHIFT IN AN IMAGE SEQUENCE

(75) Inventor: Andreas Engelsberg, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,977

(22) PCT Filed: Jan. 15, 2000

(86) PCT No.: PCT/DE00/00137

§ 371 (c)(1),
(2), (4) Date: Jan. 15, 2002

(87) PCT Pub. No.: WO00/54497

PCT Pub. Date: Sep. 14, 2000

(30) Foreign Application Priority Data

Mar. 5, 1999 (DE) ................ 199 09 622

(51) Int. Cl.
*H04N 5/14* (2006.01)
*H04N 9/64* (2006.01)

(52) U.S. Cl. ................... 348/699; 348/207

(58) Field of Classification Search ........ 348/699, 348/700, 207, 522, 333, 272, 222, 208; 396/52, 396/53, 54; H04N 5/262, 5/228
See application file for complete search history.

(56) References Cited

U.S. PATENT DOCUMENTS

| | | | |
|---|---|---|---|
| 4,924,310 A | 5/1990 | von Brandt | |
| 5,515,133 A * | 5/1996 | Taniguchi et al. | 396/155 |
| 5,614,945 A * | 3/1997 | Sekine et al. | 348/207.99 |
| 5,835,138 A * | 11/1998 | Kondo | 348/207.99 |
| 5,838,371 A * | 11/1998 | Hirose et al. | 348/240.2 |
| 5,926,212 A * | 7/1999 | Kondo | 348/207.99 |
| 5,978,020 A * | 11/1999 | Watanabe et al. | 348/207.99 |

FOREIGN PATENT DOCUMENTS

| | | |
|---|---|---|
| EP | 0 449 283 | 10/1991 |
| EP | 0 535 746 | 4/1993 |
| EP | 0 631 432 | 12/1994 |
| EP | 0 762 774 | 3/1997 |

OTHER PUBLICATIONS

Rindtorff, H., "Bildstabilisation in Consumer-Camcordern, Funktion und Wirkungsweise" (Picture and Stabilization in Consumer Camcorders: Function and Effects), Fernseh- und Kinotechnik, 1995, vol. 49, No. 1/2.

* cited by examiner

*Primary Examiner*—Nhon Diep
(74) *Attorney, Agent, or Firm*—Kenyon & Kenyon LLP

(57) ABSTRACT

A method and a device for determining an image shift in an image sequence may be used, for example, to compensate for a camera movement or other image source movement. A plurality of image zones of images are available to determine the shift, with the zone shift of any given image zone from a plurality of image zones being determined from the image data of, for example, consecutive images within any given image zone. A block matching method or a method using block shift information from a block-based coding method is used to determine the zone shift and to determine a reliability for the zone shift determination.

19 Claims, 2 Drawing Sheets

METHOD AND DEVICE FOR DETERMINING AN IMAGE SHIFT IN AN IMAGE SEQUENCE

FIELD OF THE INVENTION

The present invention relates to a method and device for determining an image shift in an image sequence.

BACKGROUND INFORMATION

A picture stabilization system whose function is to maximize the stability of a picture when shooting with a handheld camera is discussed in the reference "Bildstabilisation in Consumer-Camcordern, Funktion und Wirkungsweise" (Picture Stabilization in Consumer Camcorders: Function and Effects), H. Rindtorff, Fernseh-und Kinotechnik, vol. 49, no. 1/2, 1995. As characterized, the image is divided into four image zones in which motion vectors that describe the image shift are determined. The motion vectors in the individual image zones purportedly yield an overall motion vector which ideally represents the camera travel.

The entire motion vector is integrated into an attenuation factor, which means that past vector values are taken into account, and the magnitude of correction is reduced when the horizontal and vertical shifts exceed a limit value.

SUMMARY OF THE INVENTION

An exemplary method and/or exemplary embodiment of the present invention is directed to a method and/or device which provides that the reliability of image shift is not determined separately for the two image zones, but rather the determined shift in one of the two image zones determines the value assumed by the threshold value function and to which the shift of the second of the first two image zones are compared.

Another exemplary method of the present invention is directed to providing that the shift determination of one image zone and the determination of shift determination reliability thus do not take place independently of movements, for example, zone shifts, in other portions of an image.

Another exemplary embodiment and/or exemplary method of the present invention is directed to determining the correlation quotient, in each case, for one of the plurality of image zones according to an exemplary method having the following steps:
  shift correlation values are determined for multiple possible image shifts, using a block-matching method;
  the image shift for which maximum shift correlation values are achieved is regarded as a shift in the image zone;
  the correlation quotient is generated from the maximum of shift correlation values, divided by the average of the determined shift correlation values.

This exemplary embodiment and/or exemplary method of the present invention may be directed to determining the image shift through the entire image zone, since the shift correlation values are derived from a summation across all pixels or a selection of pixels within the image zone in question. Further, the correlation quotient may be normalized, since the maximum of the shift correlation values, from which the image shift is obtained, may be divided by the average of the calculated shift correlation values.

Another exemplary embodiment and/or exemplary method of the present invention is directed to providing that for any given value of a zone shift that is less than a specified first threshold value, the threshold value function may assume the value of a predefined second threshold value; and for any given value of a zone shift that is greater than the predefined first threshold value, the threshold value function may assume the value of the predefined second threshold value minus a product, the product including a predefined gradient parameter and a difference as factors, and the difference being formed from the given zone shift and the predefined first threshold value. Thus, an adequate reliability may be allowed for determining the zone shift in the case of larger determined shifts in an image zone, even if the correlation quotient is smaller, which may indicate a poorer correlation in the case of a smaller determined image shift. Due to the dependency of the first two image zones in determining reliability for the zone shift determination, the construction of the threshold value function means that the requirements imposed on the reliability of zone shift determination, i.e., the requirements imposed on the level of the correlation quotient may decrease in the use of a relatively large zone shift in one of the first two image zones.

Another exemplary embodiment and/or exemplary method of the present invention is directed to providing that the method is performed especially easily and economically, for example, the hardware support may allow obtainment of block shift information, for example, block shift vectors of small image blocks, at little or no additional cost, for example, from a block-based transmission method for reducing bandwidth.

Another exemplary embodiment and/or exemplary method of the present invention is directed to providing that for each of the image zones, an exemplary method having the following steps may be performed to determine a zone shift that includes a horizontal and a vertical component and to determine the reliability of the zone shift determination:
  a first frequency distribution of the frequencies of different values of the horizontal component of the block shift information may be established to determine the horizontal component of the zone shift, with the horizontal component of the zone shift corresponding to the value of the horizontal component of the block shift information for which the first frequency distribution may assume its primary maximum;
  a second frequency distribution of the frequencies of different values of the vertical component of the block shift information may be established to determine the vertical component of the zone shift, with the vertical component of the zone shift corresponding to the value of the vertical component of the block shift information for which the second frequency distribution may assume its primary maximum; and
  the reliability of the zone shift determination may be deemed to be adequate when all of the following conditions have been met:
    the absolute value of the difference between the position of the values, corresponding to the primary maximum and the secondary maximum of the first frequency distribution, of the horizontal component of the block shift information is less than a predefined first difference threshold;
    the absolute value of the difference between the position of the values, corresponding to the primary maximum and the secondary maximum of the second frequency distribution, of the vertical component of the block shift information is less than a predefined second difference threshold;

the primary maximum of the first frequency distribution is greater than a first frequency threshold; and the primary maximum of the second frequency distribution is greater than a second frequency distribution.

Using a relatively "simple" apparatus, arrangement, structure, or methods, such as, for example, monitoring the frequencies of the occurring horizontal and vertical components of the existing block shift information, the zone shift of an image zone may be determined and the reliability of the zone shift determination may be determined.

Another exemplary embodiment and/or exemplary method of the present invention is directed to separating an image movement, for example, produced by camera movement, from an additional movement that is superimposed on the image movement in some image zones of the image to be corrected, using the following steps:

the probability of an image movement occurring without the additional movement is determined at different positions in an image;

the position and dimensions are determined and permanently set for a given image zone as a function of the probability that the image movement will occur within this one image zone without the additional movement; and at least one first image zone is given priority for use in determining the shift.

In this way, image zones may be used for determining image shifts, for example, in those portions of an image that may be identified by a maximum probability that image movement will occur without the additional movement. The determination of image shifts in an image sequence may be performed with particular reliability. Another exemplary embodiment and/or exemplary method of the present invention is directed to permanently specifying the position and dimensions of the image zones for reliable determination of the image shifts in an image sequence. Thus, the shift may be reliably determined with relatively little processing effort, for example, for a special video communications scenario. A first image zone, which may be used to determine the shift, may therefore be employed by selecting its position and dimensions within the images, for example, solely to determine the shift, so that other image zones do not need to be taken into account in this case, which may reduce the processing effort for determining the image shift.

Another exemplary embodiment and/or exemplary method of the present invention is directed to providing that the position and dimensions of the at least one first image zone can be selected so that the at least one first image zone of the images to be corrected are largely filled by the image background. The image background may rarely contain any additional movement that is superimposed on the image movement produced, for example, by the unintentional movement of a camera, from one image to another between which the shift is to be determined, which can mean that a first image zone of the images to be corrected may be used to determine the shift, provided that it is filled with the image background.

Another exemplary embodiment and/or exemplary method of the present invention is directed to providing that the position and dimensions of at least one second image zone may be selected so that the at least one second image zone of the images to be corrected is largely filled by the image foreground. Thus, a shift in the images of an image sequence may be determined, especially easily and accurately if, for example, the image background is subjected to strong additional movement that is superimposed on the image movement produced, for example, by the unintentional camera movement.

Another exemplary embodiment and/or exemplary method of the present invention is directed to providing that both the at least one first image zone and the at least one second image zone are available for determining the shift. Thus, the zone shift determination may be checked because the exemplary method provides a measure for the reliability of the zone shift determination. A reliability determination for the reliability of the zone shift may serve primarily to easily and reliably separate the image movement from the additional movement superimposed upon it.

Another exemplary embodiment and/or exemplary method of the present invention is directed to providing that two first image zones and a single second image zone are available for image correction, with the shift being determined in at least one of the following:

from the average of the zone shifts of the two first image zones, when the reliability of the zone shift determination of the first two image sequences is deemed to be adequate;

from the zone shift of the one of the first two image zones in which the reliability of the zone shift determination is deemed to be adequate; and from the zone shift of the second image zone.

Different image zones having different priorities for determining the image shifts in an image sequence may be used. For example, priority may be given to the use of image zones that are largely filled by the image background for determining the image shifts, with the use of the average of the zone shifts in the first two image zones yielding a reliable shift determination. The second priority for determining the shift, using the zone shift from the first two image zones, may be selected, for example, to minimize the influence of moving objects in the background, since a moving object in one of the two first image zones may mean that the zone shift in the other of the two image zones is used to determine the image shifts in an image sequence. On the third level of priority, the image may shift from the zone shift of the second image zone, for example, an image zone that is largely filled by the image background, may be used.

Another exemplary embodiment and/or exemplary method of the present invention is directed to providing for a head-and-shoulder shot, with the first two image zones being selected in a side image zone on the left and right, for example, symmetrically to the vertical center axis of a predefined rectangular image, with the distance of the first two image zones from the bottom of the image being greater than the distance of the first two image zones from the top of the image; the second image zone in the center of the image being selected, for example, symmetrically to the vertical center axis of the rectangular image; the distance of the second image zone from the top edge, for example, being greater than the distance of the second image zone from the bottom edge. The image zones may be selected so that, for example, in a head-and-shoulder shot, to rationally use information from the image zones for determining the zone shifts and for determining image shifts in an image sequence, based on a system of priorities.

Another exemplary embodiment and/or exemplary method of the present invention is directed to determining image shifts in an image sequence and includes a shift detecting circuit (100) and an enlarging circuit (200), with the shift detecting circuit (100) including a zone shift detector (110), an image storage device (120) and a microcomputer (130); and the shift detecting circuit (100) determining the shift (15). Thus, the shift may result in faster and more economical performance of an exemplary method of to the present invention, for example, by implementing the steps of the exemplary method of the present invention, for example, in an integrated circuit or on a personal computer (pc) board.

DETAILED DESCRIPTION

Figure 1:
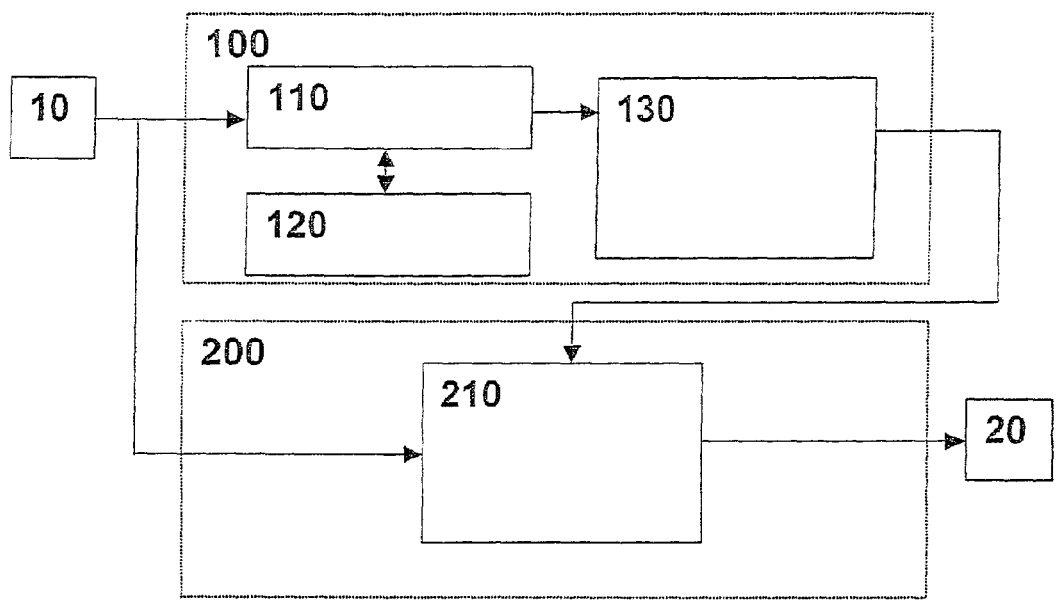
FIG. 1 shows a block diagram of an exemplary embodiment of the present invention.

FIG. 1 shows a block diagram of an exemplary device of the present invention for implementing the exemplary method of determining an image shift in an image sequence. The exemplary device of the present invention may include an input 10, an output 20, a shift detecting circuit 100, and an enlarging circuit 200. Shift detecting circuit 100 may include zone shift detector 110, an image storage device 120, and a microcomputer 130. Shift detecting circuit 100 may also include an input (not illustrated) that may be connected to input 10 of the exemplary device of the present invention as well as to zone shift detector 110 and image storage device 120. Shift detecting circuit 100 may also include an output (not illustrated) that may be connected to microcomputer 130, with zone shift detector 110 also being connected to microcomputer 130. Enlarging circuit 200 may include two inputs (not illustrated) and one output that may be connected to output 20 of the device. The two inputs of enlarging circuit 200 may each be connected to an enlarging processor 210, with one of the two inputs of enlarging circuit 200 being connected to input 10 of the device; and the other of the two inputs of enlarging circuit 200 being connected to the output of shift detecting circuit 100.

Figure 2:
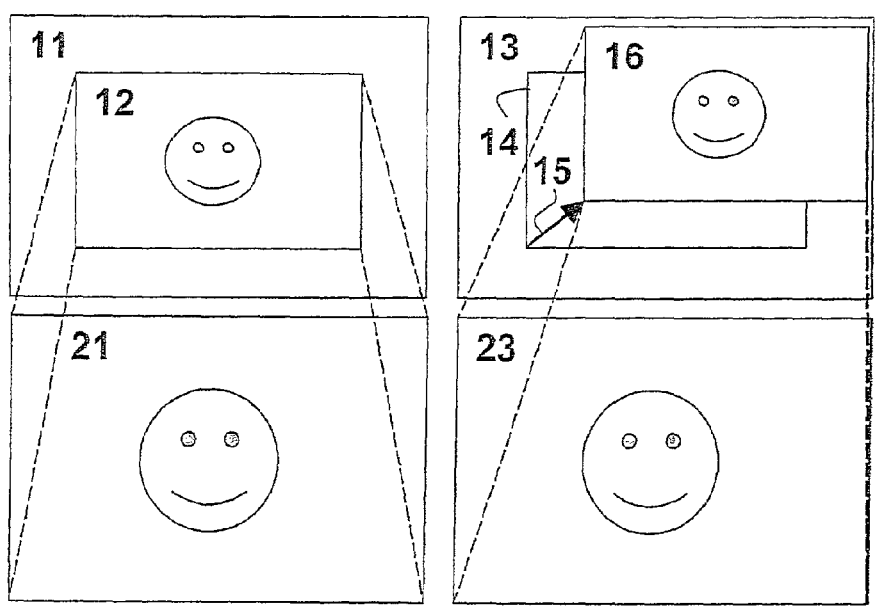
FIG. 2 shows the picture stabilization system by determining an image shift in an image sequence.

FIG. 2 shows an example of the picture stabilization system, for example, to compensate for camera movements. A first input image 13 may be corrected to form a first output image 23, using image information of a second, for example, earlier, input image 11.

Second input image 11 includes an image segment that is enlarged by increasing its size to form second output image 21. Second input image 11 is completely picked up by the camera, although a user of an exemplary device of the present invention may see, for example, only the enlarged segment in the form of second output image 21. The segment may be referred to as second image 12 or as corrected second image 12.

According to a first exemplary method of the present invention, corrected second image 12 may be used to correct first input image 13. First input image 13 may also include an image segment that is referred to here as uncorrected first image 14. Comparing uncorrected first image 14 to second image 12, i.e., corrected first image 12, allows for a determination of a shift 15 so that uncorrected first image 14 may be converted to a corrected first image 16 as a result of shift 15. The comparison of uncorrected first image 14 to second image 12, for example, may not involve using all the image data, but rather only the image data from the image zones (not illustrated) of first image 14 and second image 12.

According to a second exemplary method according to the present invention, second input image 11 may be used to correct first input image 13. Comparing first input image 13 to second input image 11 may allow a determination of a shift 15 so that uncorrected first image 14 may be converted to corrected first image 16 as a result of shift 15. The comparison of uncorrected first input image 13 to second input image 11, for example, may not involve using all the image data, but rather only the image data from the image zones (not illustrated) of first input image 13 and second input image 11.

According to both exemplary methods, corrected first image 16 may now be displayed for the user in the form of first output image 23. Compared to the second output image, the shift of first input image 13, i.e., corrected first image 16, respectively, may no longer be seen in first output image 23.

Figure 3:
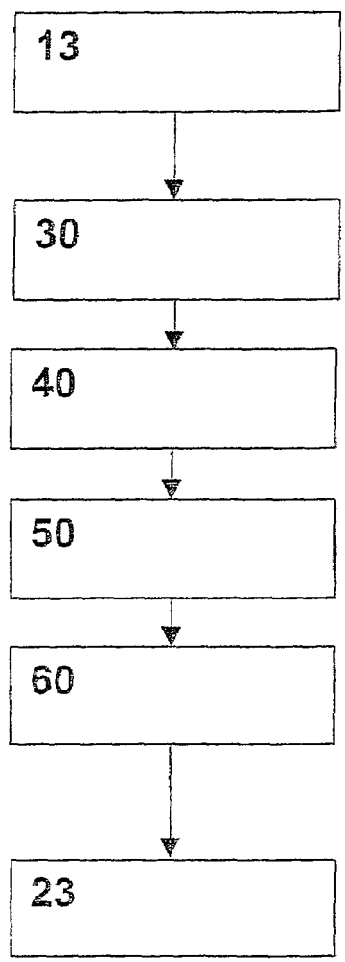
FIG. 3 shows a flowchart of the picture stabilization system.

FIG. 3 shows steps of an exemplary method of the present invention, using the correction of first input image 13 as an example. The zone shifts of image zones may be determined in a first step 30. First input image 13 may be compared to corrected, for example, directly preceding second image 12 or to second, for example, directly preceding input for starting image 11. The shift of first image 14 may be subsequently determined in a step 40 in an exemplary method of the present invention. Uncorrected first image 14 may be shifted by shift vector 15 in a third step 50. This operation may yield corrected first image 16. Corrected first image 16 may then be enlarged in a fourth step 60, resulting in first output image 23.

To correct a further input image using an exemplary method according to the present invention, the result of third step 50 may be supplied to first step 30 by storing the image, for example, in image storage device 120. Third step 50 may yield corrected first image 16, which thus may replace corrected second image 12 and may be used in conjunction with the correction of the further input image to determine zone shifts in first step 30.

Alternatively, first input image 13, i.e., uncorrected first image 14, may be stored in image storage device 120 together with determined shift 15 for correcting a further input image.

Figure 4:
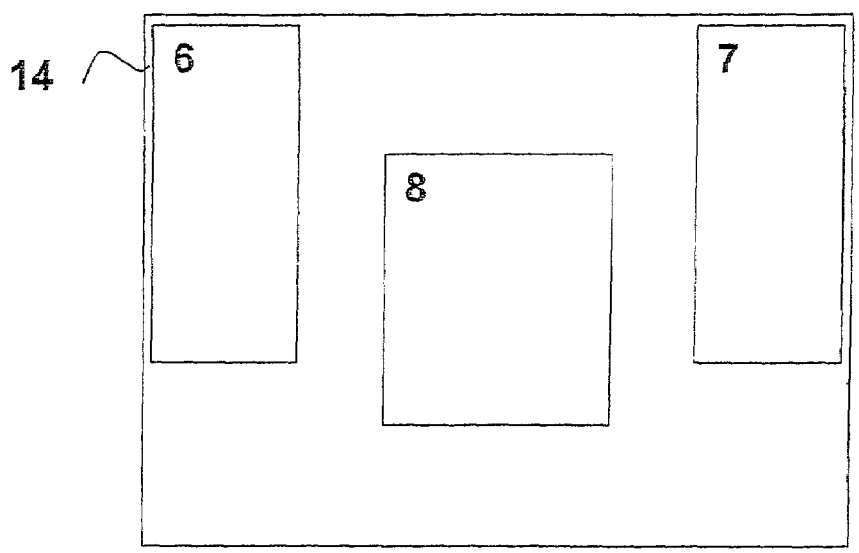
FIG. 4 shows selecting image zones within an image for performing an exemplary method of the present invention.

FIG. 4 shows an example of a distribution of image segments 6, 7, 8 within first input image 14. Two first image zones 6, 7 may be selected, for example, for applying an exemplary method of the present invention to a head-and-shoulder shot, symmetrically to the vertical center axis of the given rectangular first image 14. The distance of first two image zones 6,7 from the bottom of the image may be greater than the distance of first two image zones 6, 7 from the top of the image.

A second image zone 8 may be selected in the center of first image 14, for example, symmetrically to the vertical center axis of the rectangular image, with the distance of second image zone 8 from the top of the image preferably being greater than the distance of the second image zone from the bottom of the image.

An exemplary method of the present invention may be directed to determining a shift 15 of images in an image sequence and may be used for picture stabilization to compensate for camera movements with regard to digital video stabilization in mobile video communications equipment. This may reduce and/or eliminate movements caused by the mobile use of video communications equipment.

The exemplary method may involve deriving the camera movement from the relative shift in consecutive images and extracting from one input image, e.g., first input image 13, the segment, for example, corrected first image 16, that compensates for the camera movement on the basis of determined shift 15, for example, of corrected first image 16 relative to uncorrected first image 14.

With the exemplary method of the present invention, for example, a plurality of image zones 6, 7, 8 may be provided for determining shift 15. The image zones may be clearly determined by their positions and dimensions within the image. By selecting the position and dimensions of image zones 6, 7, 8, it may be easy to separate an image movement that is produced by a camera movement from an additional movement that is superimposed on the image movement in segments of the image to be corrected.

For this purpose, the probability that the image movement will occur without the additional movement may be determined in different positions of the images in an image sequence, yielding preferred components within the image that can be used to separate the image movement from the additional movement. For example, selecting image zones 6, 7, 8 illustrated in FIG. 4 may be useful for the special shooting situation of a speaker which is centered in the image. The special characteristics of this shooting situation may be utilized as a-priori factors in selecting and defining image zones 6, 7, 8.

According to this shooting situation, for example, the first two image zones 6, 7 are assumed to be largely located in the image background, while second image zone 8 is assumed to be largely in the foreground. This means that first two image zones 6, 7 may be primarily filled with image data from the image background, while second image zone 8 may be primarily filled with image data from the image foreground. This can allow a prioritization of first two image zones 6, 7, thereby determining a shift 15 of images in an image sequence, for example, by determining the zone shift in first two image zones 6, 7. Second image zone 8 may be used to determine image shift 15 only if the use of zone shifts from first two image zones 6, 7 allows for only a zone shift that is subject to high unreliability, i.e., to an insufficiently strong reliability.

In the example given, this prioritization means that picture stabilization may be performed with image background information. However, the exemplary methods in this case do not apply exclusively to distinguishing and setting different priorities to determine a shift in images in an image sequence from background and foreground information, but also, for example, to using criteria such as edge determination, absence of edge determination and the like.

The first two image zones 6,7 in the example given may have a length of 120 pixels in the vertical direction and 40 pixels in the horizontal direction in Qcif format. In this format, second image zone 8 may measure 135 pixels in the vertical direction and 85 pixels in the horizontal direction.

Another exemplary method of the present invention is directed to determining a shift 15 in images in an image sequence which also serves to minimize the influence of moving objects, for example, in the image background, by using a decision criterion to detect moving objects in image zones. The moving objects, for example, in one of image zones 6, 7, 8 may produce an additional movement that is superimposed on the shift produced by the camera movement.

To determine the zone shift for an image zone 6, 7, 8, two alternative methods may be used according to the present invention, depending on whether block shift information from a block-based coding method, for example, a block-based transmission method for reducing bandwidth, is accessible using a relatively "simple" apparatus, arrangement, structure or method. If the block shift information is not easily accessible, a block-matching method may be used to determine the zone shift, making it possible to detect an additional movement, i.e., a local movement, within one of two first image zones 6, 7. A local movement occurring in an image zone 6, 7, 8, e.g., an emerging object, may be detected by evaluating the shift correlation values from the block matching method. To do this, the ratio between the average of the shift correction values and the maximum of the correlation values may be compared with an adaptive threshold value function.

To determine the average of the shift correlation values, the sum of all determined correlation values may be formed and subsequently divided by the number of these values. The maximum of the shift correlation values may be assumed for a determined zone shift. The zone shift corresponding to the maximum of the shift correlation values may be assumed as the zone shift of the image zone. The correlation quotient may correspond to the maximum of shift correlation values, divided by the average of the shift correlation values, and may thus be normalized. An additional movement, i.e., a local movement within the image zone, may be detected if the correlation quotient is less than the value of an adaptive threshold value function. The adaptive threshold value function may be dependent on the length of a shift vector that indicates a zone shift.

According to the exemplary embodiment and/or exemplary method of the present invention, the correlation quotient for first image zone 6, 7 may be compared to the value of the adaptive threshold value function to detect an additional movement, i.e., a local movement, in one of first two image zones 6, 7, the vector length of shift 15 of the other of first two image zones 6, 7 yielding the value for the adaptive threshold value function. The threshold value function may be defined as follows:

for any given vector length of the zone shift vector, i.e., for any given zone shift that is smaller than a predefined first threshold value, the threshold value function may assume a predefined second threshold value;

for any given vector length of the zone shift vector, i.e., for any given zone shift that is greater than the predefined first threshold value, the threshold value function may assume the value of the predefined second threshold value minus a product, with the product including a predefined gradient parameter and a difference as factors, and with the difference being derived from the given zone shift and the predefined first threshold value.

Another exemplary method for determining image shifts in an image sequence may be based, for example, on the use of block shift information from a block-based coding method. The shift vectors of small blocks, e.g., having a size of 8×8 or 16×16, may be used to determine the zone shift in image zones 6, 7, 8. The information from the block-based coding method may thus be used to reduce computing effort. This approach may be attractive if the block shift vectors need to be obtained with little or no additional effort, for example, using hardware support. Detecting local movement in an image zone 6, 7, 8, for example, in one of first two image zones 6, 7, may be accomplished with relative ease if shift vectors of small blocks in the image are available.

Initially, all shift vectors for blocks located in one of image zones 6, 7, 8 may be assigned to corresponding image zone 6, 7, 8. Separate frequency distributions, i.e., histograms, may be created from the assigned shift vectors for the horizontal and vertical components. For each image zone 6, 7, 8, this may yield a first frequency distribution for the horizontal component and a second frequency distribution for the vertical component of the image block shift vectors. An additional movement, i.e., local movement, may be detected by analyzing the frequency distributions assigned to an image zone. If the difference in position between the primary maximum and the largest secondary maximum of one of the two assigned frequency distributions exceeds a certain threshold value, and the size of the primary maximum drops below a threshold value, a local movement may have been detected. Detecting a local or additional movement in an image zone means that the zone shift may not have been determined with a sufficient amount of reliability. Determining the reliability of the zone shift determination thus may result in a negative result as far as zone shift determination is concerned.

Another exemplary method of the present invention is directed to determining a zone shift and determining the reliability of the zone shift determination and may be described as follows, with the zone shift including a horizontal and a vertical component:

a first frequency distribution of the frequencies of different values for the horizontal component of the block shift information is established to determine the horizontal component of the zone shift, with the horizontal component of the zone shift corresponding to the value of the horizontal component of the block shift information for which the first frequency distribution assumes its primary maximum;

a second frequency distribution of the frequencies of different values for the vertical component of the block shift information is established to determine the vertical component of the zone shift, with the vertical component of the zone shift corresponding to the value of the vertical component of the block shift information for which the second frequency distribution assumes its primary maximum;

the reliability of the zone shift determination is deemed to be adequate when all of the following conditions have been met:

the absolute value of the difference in position of the values of the horizontal component of the block shift information, that correspond to the primary maximum and the secondary maximum of the first frequency distribution, is less than a predefined first difference threshold;

the absolute value of the difference in position of the values of the vertical component of the block shift information, that correspond to the primary maximum and the secondary maximum of the second frequency distribution, is less than a predefined second difference threshold;

the primary maximum of the first frequency distribution is greater than a first frequency threshold; and the primary maximum of the second frequency distribution is greater than a second frequency threshold.

The exemplary method may be used to determine image shifts in an image sequence, thus reducing computing effort.

A criterion may be used that is suitable for detecting local movements within relevant image zone 6, 7, 8, so that the reliability of the zone shift determination is inadequate.

What is claimed is:

1. A method for determining an image shift in an image sequence to compensate for an image source movement, a plurality of image zones of images being available to determine the image shift, each of the plurality of image zones being at a specific position in the images and each having predefined dimensions of predefined numbers of pixels in different image directions, the method comprising:

determining the image shift from one of (i) first image data of the first image and second image data of a second image, and (ii) the first image data of the first image and input image data of an input image for use in correcting the first image in the image sequence;

determining a zone shift of any given image zone of the plurality of image zones from one of (i) the first image data of the first image and the second image data of the second image within the given image zone, and (ii) the first image data of the first image and the input image data of the input image within the given image zone, including determining the zone shift in two image zones and determining a reliability for the zone shift determination by:

forming the zone shift and a correlation quotient for each of the two image zones;

determining a threshold value function as a function of a corresponding value of determined zone shifts in the two image zones;

comparing the correlation quotient of one of the two image zones to a comparison value obtained from the threshold value function for a zone shift of another of the two image zones;

determining that the reliability of the zone shift determination is adequate for the one image zone of the two image zones if the correlation quotient determined for the one image zone is greater than the comparison value; and using the zone shift of one image zone of the plurality of image zones as the image shift as a function of the reliability for the zone shift determination of the one image zone.

2. The method of claim 1, wherein the correlation quotient for one of the plurality of image zones is determined by:

determining shift correlation values for multiple possible zone shifts using block-matching;

determining the zone shift of the plurality of image zones to be a zone shift associated with a maximum of the shift correlation values; and forming the correlation quotient by dividing the maximum of the shift correlation values by an average of the shift correlation values.

3. The method of claim 1, wherein:

the threshold value function assumes a predefined second threshold value for a given zone shift value less than a predefined first threshold value;

the threshold value function assumes a value that is the predefined second threshold value minus a product for the given zone shift value greater than the predefined first threshold value;

the product includes as factors a predefined gradient parameter and a difference; and the difference is formed from the given zone shift and the predefined first threshold value.

4. The method of claim 1, further comprising:

separating an image movement produced by the image source movement from an additional movement superimposed on the image movement in at least one of the image zones of the image to be corrected by:

determining that a probability that the image movement will occur without the additional movement at different image positions; and determining the position and dimensions of a given image zone, and permanently specifying as a function of the probability that the image movement will occur without the additional movement within the given image zone.

5. The method of claim 4, wherein the image source is a camera.

6. The method of claim 4, wherein at least one first image zone is used to determine the image shift.

7. The method of claim 1, further comprising:
selecting a position and dimensions of at least one first image zone so that the at least one first image zone of the images to be corrected is largely filled by an image background.

8. The method of claim 7, wherein the at least one first image zone and at least one second image zone are available to determine the image shift.

9. The method of claim 7, wherein two first image zones and a single second image zone are available for correcting the image, and the image shift is determined, in descending order of priority, from one of:
an average of zone shifts of the first two image zones if the reliability of the zone shift determination of the first two image zones is determined to be adequate;
the zone shift of one of the two first image zones for which the reliability of the zone shift determination is determined to be adequate; and
a zone shift of the single second image zone.

10. The method of claim 9, wherein the source image movement is a camera movement and the method is used for a head-and-shoulder shot, further comprising:
selecting the first two image zones in a side area to the left and right of a vertical center axis of a predefined rectangular image; and
selecting the single second image zone in a center of the image with respect to the vertical center axis of the rectangular image;
wherein:
a first bottom distance of the first two image zones from a bottom of the image is greater than a first top distance of the first two image zones from a top of the image; and
a second top distance of the single second image zone from the top of the image is greater than the second bottom distance of the single second image zone from the bottom of the image.

11. The method of claim 10, wherein:
the first two image zones is selected in a side area symmetric to the vertical center axis of the predefined rectangular image; and
the single second image zone is selected in a center of the image symmetric to the vertical center axis of the rectangular image.

12. The method of claim 1, further comprising:
selecting position and dimensions of at least one second image zone so that the at least one second image zone of the images to be corrected is largely filled with an image foreground.

13. The method of claim 12, wherein at least one first image zone and the at least one second image zone are available to determine the image shift.

14. The method of claim 1, wherein the image source is a camera.

15. The method of claim 1, wherein one of the following is satisfied:
the second image data of the second image directly precedes the first image in the image sequence; and
the input image data of the input image directly precedes the first image in the image sequence.

16. The method of claim 1, further comprising:
selecting a position and dimensions of at least one first image zone so that the at least one first image zone of the images to be corrected is largely filled by an image background; and
selecting position and dimensions of at least one second image zone so that the at least one second image zone of the images to be corrected is largely filled with an image foreground.

17. The method of claim 16, wherein the at least one first image zone and the at least one second image zone are available to determine the image shift.

18. A method for determining an image shift in an image sequence of a plurality of images to compensate for a camera movement, at least one image zone of the plurality of images being available to determine the image shift, the at least one image zone being at a predefined position in the images and having predefined dimensions of predefined numbers of pixels in different image directions, the method comprising:
determining the image shift from one of (i) first image data of a first image and second image data of a second image, and (ii) the first image data of the first image and input image data of an input image by using a zone shift of the at least one image zone as the image shift; and
determining the zone shift using block shift information from block-based coding used for the at least one image zone, wherein:
image blocks located in at least one image zone are reflected in the block shift information of the at least one image zone,
the at least one image zone is used as a function of a reliability of a zone shift determination, and
the zone shift for the at least one image zone, the zone shift including a horizontal component and a vertical component, and the reliability of a zone shift determination are determined by:
establishing a first frequency distribution of frequencies of different values for a horizontal component of the block shift information to determine the horizontal component of the zone shift, the horizontal component of the zone shift corresponding to a horizontal component value of the block shift information for which the first frequency distribution assumes its primary maximum;
establishing a second frequency distribution of frequencies of different values for a vertical component of the block shift information to determine the vertical component of the zone shift, the vertical component of the zone shift corresponding to a vertical component value of the of the block shift information for which the second frequency distribution assumes its primary maximum;
determining that the reliability of the zone shift is adequate when the following conditions are met:
an absolute value of a difference in position of values corresponding to the primary maximum and a secondary maximum of the first frequency distribution of the horizontal component of the block shift information is less than a predefined first difference threshold;
the absolute value of the difference in position of the values corresponding to the primary maximum and a secondary maximum of the second frequency distribution of the vertical component of the block shift information is less than a predefined second difference threshold;

the primary maximum of the first frequency distribution is greater than a first frequency threshold; and the primary maximum of the second frequency distribution is greater than a second frequency threshold.

19. A device for determining an image shift, comprising:

an image shift detecting arrangement, including a zone shift detector, an image storage device, and a microcomputer, wherein the shift detecting arrangement determines the image shift; and an enlarging arrangement;

wherein the device is operable to determine the image shift in an image sequence to compensate for an image source movement, a plurality of image zones of images being available to determine the image shift, each of the plurality of image zones being at a specific position in the images and each having predefined dimensions of predefined numbers of pixels in different image directions, by:

determining the image shift from one of (i) first image data of the first image and second image data of a second image, and (ii) the first image data of the first image and input image data of an input image for use in correcting the first image in the image sequence;

determining a zone shift of any given image zone of the plurality of image zones from one of (i) the first image data of the first image and the second image data of the second image within the given image zone, and (ii) the first image data of the first image and the input image data of the input image within the given image zone, including determining the zone shift in two image zones and determining a reliability for the zone shift determination by:

forming the zone shift and a correlation quotient for each of the two image zones;

determining a threshold value function as a function of a corresponding value of determined zone shifts in the two image zones;

comparing the correlation quotient of one of the two image zones to a comparison value obtained from the threshold value function for a zone shift of another of the two image zones; and determining that the reliability of the zone shift determination is adequate for the one image zone of the two image zones if the correlation quotient determined for the one image zone is greater than the comparison value; and using the zone shift of one image zone of the plurality of image zones as the image shift as a function of the reliability for the zone shift determination of the one image zone.

* * * * *